Sept. 6, 1932.  W. H. GERSTENSLAGER  1,875,439
MACHINE FOR TESTING BELTS
Filed Feb. 9, 1931

Inventor
William H. Gerstenslager
By Bee & Bush
Attorneys

Patented Sept. 6, 1932

1,875,439

UNITED STATES PATENT OFFICE

WILLIAM H. GERSTENSLAGER, OF AKRON, OHIO, ASSIGNOR TO THE GOODYEAR TIRE & RUBBER COMPANY, OF AKRON, OHIO, A CORPORATION OF OHIO

MACHINE FOR TESTING BELTS

Application filed February 9, 1931. Serial No. 514,413.

The invention relates to machines for testing endless belts, and it has for one of its principal objects the provision of a machine for measuring sidewise movement of an endless flat belt while the latter is operated under tension over pulleys.

One type of flat, power-transmitting belt manufactured comprises a core of longitudinally extending cords enclosed by a rubberized fabric envelope. Certain belts of this type are manufactured with all of the cords twisted in one direction, whereas in other belts, the cords on one side of the median center line of the belt are twisted in one direction, while those on the opposite side of the center line are twisted in the other direction. In either case, it is essential that the cords be disposed in their adjacent positions under substantially uniform tension or else the belt will have a tendency to move sidewise when it is operated over pulleys. Usually, the cords are subjected to substantially the same tensions but it is very desirable that some means be provided for determining the tendency of a belt to slip sidewise on pulleys, in order to eliminate the sale of undesirable belts.

The invention comprises a pair of adjustably spaced crowned pulleys, one of which is driven, which support an endless flat belt. One of the pulleys is mounted on an adjustable slide, and means are provided for moving the pulley and subjecting the belt to a predetermined tensile force. Indicating means extending transversely above the belt adjacent one of the pulleys, measures any sidewise movement of the edges of the belt during its movement over the pulleys. The indicating means are adjustable for the purpose of accommodating belts of various widths. Use of the invention has eliminated the sale of unsatisfactory flat belts, which occasionally occurred prior to the invention.

Figure 1:
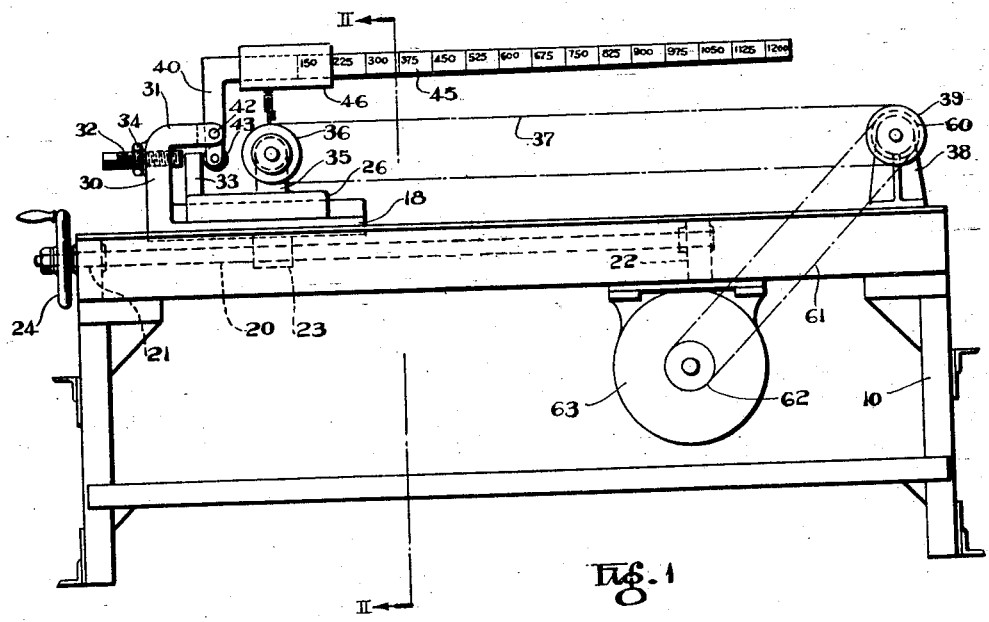
Figure 2:
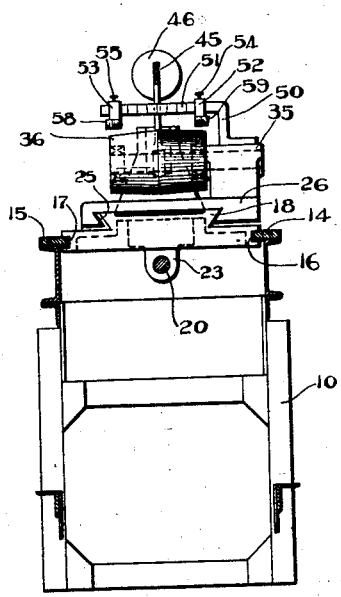

For a better understanding of the invention, reference may now be had to the accompanying drawing, in which Fig. 1 is a side-elevational view of a machine constructed according to the invention, and Fig. 2 is a cross-sectional view taken substantially along the line II—II of Fig. 1.

Referring to both figures, a framework 10 is provided having a pair of elongated bars 14 and 15 which project respectively into grooves 16 and 17 provided in opposite edges of a slide 18. The slide is adjustable longitudinally of the framework 10 by means of a screw 20 journaled at opposite ends in bearings 21 and 22 forming part of the framework, and threaded intermediate its ends through a block 23 depending from the slide 18. A hand wheel 24 secured to one end of the screw facilitates its operation. The upper portion of the slide 18 is provided with gibs 25 which retain a second slide 26 mounted on the first slide. One end of the slide 18 is provided with a vertically projecting portion 30 which terminates in an offset portion 31. A screw 32 threaded through the portion 30 is provided for the purpose of limiting movement of the slide 26 in one direction, and the slide 26 is provided with a vertically projecting portion 33 adapted to abut the end of the screw. A lock nut 34 secures the screw in any adjusted position. A bearing bracket 35 projects above the slide 26 and a pulley 36 is journaled at one end therein.

At the opposite end of the framework 10, a bearing bracket 38 is provided which rotatably supports a pulley 39 similar to the pulley 36. The pulleys 36 and 39 are adapted to retain an endless belt 37 and for tensioning the belt 37 an angle arm 40 is pivoted to the offset portion 31 on the slide 26, as indicated at 42, and is provided with a roller 43 adapted to cooperate with the vertically projecting portion 33 of the slide 26. A horizontal portion 45 of the angle arm 40, operable to apply tensile force to the belt, is provided with a weight 46 which may be moved along a graduated portion of the bar. It is evident that the weight 46 tends to move the roller 43 against the portion 33 of the slide 26, and consequently, the pulley 36 away from the pulley 39. In this manner variable tensions may be applied to the belt.

As best shown by Fig. 2, an angle bracket 50 projects from the bearing bracket 35 and is provided with a horizontal portion 51 extending transversely above the pulley 36. The portion 51 of the bracket is graduated according to a predetermined scale, and also is provided with clamps 52 and 53 adjustably secured thereto by stud bolts 54 and 55. The clamps 52 and 53 are provided respectively with graduated scales 59 and 58 adapted to overlie the edges of the belt 37. It is apparent that the clamps 52 and 53 may be so adjusted that sidewise movement of belts of various widths readily may be measured.

The pulley 39 is driven in any suitable manner, as for example, by means of a sprocket wheel 60 rigid with the pulley, over which a chain 61 is trained. The chain 61 in turn is trained about a sprocket wheel 62 on the shaft of a motor 63.

When a belt 37 is mounted on the rollers 36 and 39, and predetermined tension is applied to the belt while it is driven by the motor 63, it is evident that the scales 59 and 58 may be so adjusted that they overlie the edges of the belt. Accordingly, while the belt is traveling about the pulleys, any movement of its edges may be accurately measured.

It is apparent from the description of the machine's operation that the sale of more uniform belting is assured, and that undesirable products are eliminated from commercial use. The machine constitutes a very simple means for indicating sidewise movement of the belt, and little time is required for its operation.

Although only the preferred form of the invention has been described and shown in detail, it will be apparent to those skilled in the art that the invention is not so limited but that various minor modifications may be made therein without departing from the spirit of the invention or from the scope of the appended claims. It is intended that the patent shall cover, by suitable expression in the appended claims, whatever features of patentable novelty reside in the invention.

What I claim is:

1. A machine for testing endless belts comprising a frame, a pair of pulleys rotatably mounted in the frame for supporting an endless belt, means for driving one of the pulleys, and means for measuring the sidewise movement of the belt as it is driven.

2. A machine for testing endless belts comprising a frame, a pair of pulleys rotatably mounted in the frame for supporting an endless belt, means for driving one of the pulleys, means for indicating the sidewise movement of the belt as it is driven, and means for applying a variable tension to the belt.

3. A machine for testing endless belts, comprising a frame, a pair of crowned pulleys rotatably mounted in the frame for supporting an endless belt, means for driving one of the pulleys, and means for measuring the sidewise movement of the belt as it is driven.

4. A machine for testing endless belts comprising a frame, a pair of pulleys rotatably mounted in the frame for supporting an endless belt, means for driving one of the pulleys, and means for indicating the sidewise movement of the belt as it is driven, said latter means including a member extending transversely of the belt.

5. A machine for testing endless belts comprising a frame, a pair of pulleys rotatably mounted in the frame for supporting an endless belt, means for driving one of the pulleys, and means for indicating the sidewise movement of the belt as it is driven, said means including a member extending transversely of the belt, and individual scales adjustably mounted on the member adjacent the paths in which the edges of the belt travel.

6. A machine for testing endless belts comprising a frame, a slide on the frame, means for adjusting the slide, a second slide mounted on the first slide, a pulley mounted on the second slide, a second pulley mounted on the frame in alignment with the first pulley, said pulleys being adapted to support an endless belt, means for driving one of the pulleys, means for varying the position of the second slide in order to vary the tension on the belt, and means for measuring any sidewise movement of the belt.

7. A machine for testing endless belts comprising a frame, a slide on the frame, means for adjusting the slide, a second slide mounted on the first slide, a pulley mounted on the second slide, a second pulley mounted on the frame in alignment with the first pulley, said pulleys being adapted to support an endless belt, means for driving one of the pulleys, measuring means for varying the position of the second slide in order to vary the tension on the pulley, and means for measuring any sidewise movement of the belt.

In witness whereof, I have hereunto signed my name at Akron, in the county of Summit and State of Ohio, U. S. A., this 4th day of February, 1931.

WILLIAM H. GERSTENSLAGER.